(12) United States Patent
Kang

(10) Patent No.: US 8,931,089 B2
(45) Date of Patent: Jan. 6, 2015

(54) SYSTEM AND METHOD FOR IMPLEMENTING A HIDDEN SERVER

(75) Inventor: Brent ByungHoon Kang, Fairfax, VA (US)

(73) Assignee: Korea Advanced Institute of Science and Technology, Daejeon (KR)

(*) Notice: Subject to any disclaimer, the term of this patent is extended or adjusted under 35 U.S.C. 154(b) by 0 days.

(21) Appl. No.: 13/349,247

(22) Filed: Jan. 12, 2012

(65) Prior Publication Data
US 2012/0180127 A1 Jul. 12, 2012

Related U.S. Application Data

(60) Provisional application No. 61/431,890, filed on Jan. 12, 2011.

(51) Int. Cl.
*G06F 11/00* (2006.01)
*H04L 29/06* (2006.01)

(52) U.S. Cl.
CPC .................................. *H04L 63/1491* (2013.01)
USPC ................................ 726/22; 726/12; 709/225

(58) Field of Classification Search
USPC ....................................... 726/22–26; 713/188
See application file for complete search history.

(56) References Cited

U.S. PATENT DOCUMENTS

| | | | |
|---|---|---|---|
| 7,039,721 B1 * | 5/2006 | Wu et al. | 709/245 |
| 7,093,288 B1 * | 8/2006 | Hydrie et al. | 726/13 |
| 7,120,142 B1 * | 10/2006 | Oz et al. | 370/352 |
| 7,185,360 B1 * | 2/2007 | Anton et al. | 726/3 |
| 7,283,542 B2 * | 10/2007 | Mitchell | 370/401 |
| 7,552,475 B2 * | 6/2009 | Piwonka et al. | 726/22 |
| 7,694,343 B2 * | 4/2010 | Sobel et al. | 726/27 |
| 7,917,593 B1 * | 3/2011 | Lee | 709/206 |
| 8,006,305 B2 * | 8/2011 | Aziz | 726/24 |
| 8,176,557 B2 * | 5/2012 | Adelstein et al. | 726/23 |
| 8,302,161 B2 * | 10/2012 | Burch et al. | 726/3 |
| 2011/0302628 A1 * | 12/2011 | Mackler | 726/3 |

OTHER PUBLICATIONS

Northcutt, Stephen, "The Attack Surface Program", Security Laboratory: Defense in Depth Series, The SANS Technology Institute, Jan. 7, 2011 (2 pages).
Howard, Michael, "Mitigate Security Risks by Minimizing the Code You Expose to Untrusted Users", MSDN Magazine, Nov. 2004 (5 pages) http://msdn.microsoft.com/en-us/magazine/cc163882.aspx.
Kaminsky, Dan, "Black Ops 2008: It's the End of the Cache As We Know It", Black Hat Japan Keynote Edition, www_doxpara.com/DMK_BOK8.ppt, 2008.
Meier, J. et al., "Improving Web Application Security: Threats and Countermeasures," 2003 http://www.msdn.microsoft.com/en-us/library/ff649874.aspx.
Cox, Benjamin et al., "N-Variant Systems: A Secretless Framework for Security Through Diversity," 15th USENIX Security Symposium, Vancouver, British Columbia, Aug. 2006.
Rekhter, B. et al., "Address Allocation for Private Internets," Feb. 1996. http://tools.ietf.org/html/rfc1918.

* cited by examiner

*Primary Examiner* — Amare F Tabor
(74) *Attorney, Agent, or Firm* — DLA Piper LLP (US)

(57) ABSTRACT

A technology for preventing network attacks. A service request is intercepted at an unaddressed port of a hidden device from a second device. The service request intended for a visible device is processed by the hidden device. A response may be provided based on the processing and sent to the second device.

22 Claims, 8 Drawing Sheets

SYSTEM AND METHOD FOR IMPLEMENTING A HIDDEN SERVER

CROSS-REFERENCE TO RELATED APPLICATIONS

This application claims the benefit of U.S. Provisional Application No. 61/431,890, filed on Jan. 12, 2011, entitled "Server Triangulization and Ghosting," which is hereby incorporated by reference in its entirety

DETAILED DESCRIPTION OF VARIOUS EMBODIMENTS

Figure 1:
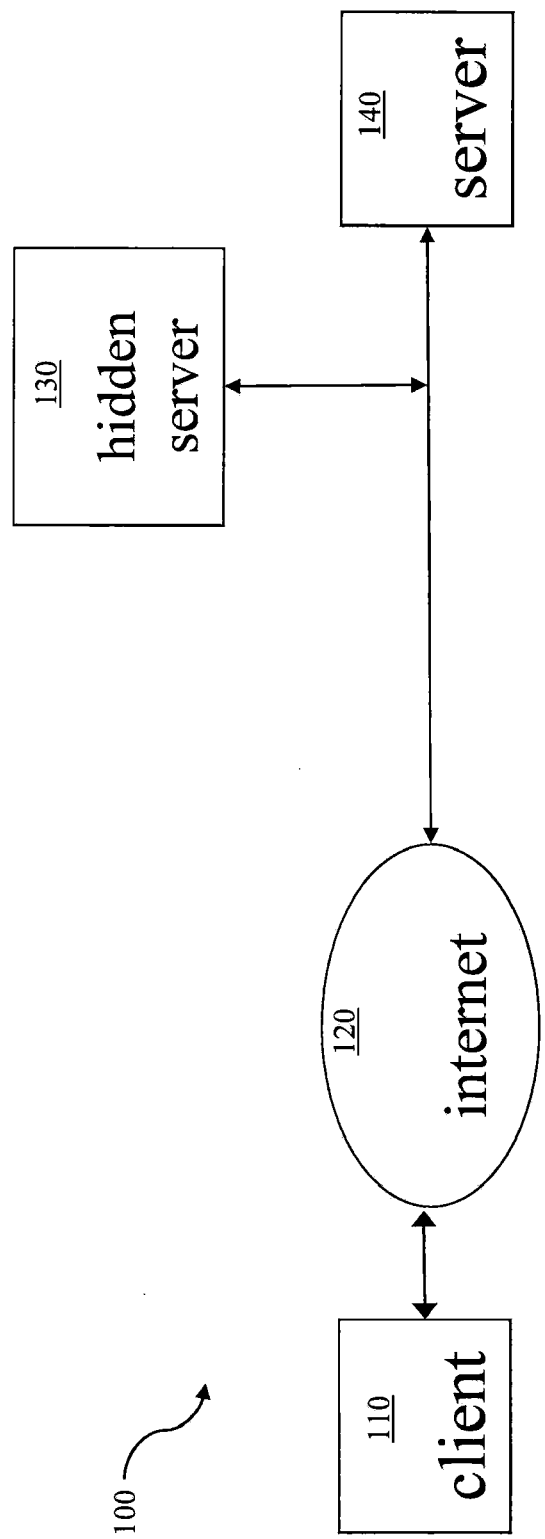
FIG. 1 is a block diagram of an embodiment of a communication network which includes a hidden server.

Embodiments of the present invention relate to systems and methods of preventing attacks on servers in a network. Prevention of attacks is accomplished at least through the use of a hidden server. The hidden server may silently monitor communication between a client and a visible server. The hidden server may further selectively provide protected data, services or protocols to authorized clients by responding for the visible server to a request.

The various embodiments may include communications that may request access to protected data, services or protocols supported by a visible device having a visible address. A hidden device having a hidden address may silently monitor the requests and selectively respond by fulfilling the request in place of the visible device. The selective responses may be guided by a segmentation policy that reduces an attack surface of the hidden device and the protected data, services and protocols. The policy may reduce an attack surface by reducing the number of avenues for a requesting device to compromise the integrity of the secured data. A response from a hidden device in place of the visible device may occur transparently, so a requesting device is unaware that it is receiving data from a hidden device instead of the visible device.

A visible device and a hidden device may include a processor, controller or the like, configured to process data and an interface for communicating data. For example, a visible device and a hidden device may include hardware or a combination of hardware and software, such as a personal computer, a laptop computer, a handheld computer, a telephone, a computer application, a client, a server or any combination of the foregoing.

A request may conform to known addressing-based communications. For instance, a request may seek access to a particular piece of data, a service or a protocol. A request may further identify an address of a visible device to fulfill the request. Other features of a request are possible, and will vary based on the particular implementation details of the protocol used for implementing communications with the visible device and the hidden device.

Silently monitoring data requests at a hidden device may include receiving a copy of a request without establishing a connection between the hidden device and a requesting device. Moreover, requests not complying with a segmentation policy of the hidden device may be ignored by a monitoring hidden device. Other aspects of the monitoring are possible and may depend on the particular implementation details of the visible device and the hidden device.

A segmentation policy may include components for segmenting a hidden device from a visible device to which requests are addressed. For example, the segmentation policy may include hiding an address of a hidden device while exposing an address of a visible device to which data requests from a requesting device are addressed. Alternatively, a hidden device may not even have an address. Where an address of a hidden device is hidden, it may be unknown to requesting devices and visible devices. Thus, if the security of a visible device is compromised by a requesting device, the requesting device may not learn a hidden device's address, or its implementation details. A segmentation policy may also include fingerprint scrubbing for reducing the effects of responding to data requests from a hidden device instead of a visible device to which a data request was addressed. Segmentation between a hidden device and a visible device may also include reducing software and hardware overlap between the devices. For example, a hidden device and a visible device may be configured with different hardware, different operating systems, different protocol software and different application software. A reduction in hardware and software overlap may also include configuring a hidden device to include software for only one service while a visible device may be configured to include software for multiple services. As a final example, segmentation may include configuring a hidden device to respond only to data requests from requesting devices having authorization to access the secured data stored on the hidden device.

FIG. 1 shows a network 100 containing a client 110 which communicates with servers 130 and 140 over a network, such as the internet 120. Client 110 sends a service request intended for server 140 which has a visible address. The visible address may be an address, such as an IP address, known to client 110. The service request may be addressed to the visible address of server 140. Hidden server 130, which may not have an address, may intercept the service request before it reaches server 140. Hidden server 130 processes the service request and sends a response to client 110 using the visible address of server 140 as the source address of the response.

The protocol used in this communication may be any type of protocol commonly used in network communication including a connection-oriented protocol such as transmission control protocol (TCP). The service requests and responses in TCP contain a source address and a destination address.

To receive service requests addressed to visible server 140, hidden server 130 may eavesdrop on the connection between client 110 and visible server 140. When hidden server 130 eavesdrops, hidden server 130 receives copies of the service request while the original service request may be forwarded to visible server 140. The response generated by visible server 140 may be blocked by an intermediate device, such as a gateway, router, bridge, or switch, or a firewall while the response generated by hidden server 130 is allowed to reach client 110.

The operating system of visible server 140 may be of a first type. Examples of operating systems include Windows, Linux, Unix, and OS-X. The operating system may also change over time to protect the integrity of visible server 140. Visible server 140 may also run simultaneous instances of operating systems as virtual machines.

The operating system of hidden server 130 may be a second type different from the type of operating system running on visible server 140. Examples of operating systems include Windows, Linux, Unix and OS-X. The difference in operating systems between visible server 140 and hidden server 130 should reduce the likelihood that attacks directed against the operating system of visible server 140 will be successful against the operating system of hidden server 130. Other hardware and software features may also be different between visible server 140 and hidden server 130 to similarly reduce the overlap of security vulnerabilities between the servers.

The response generated by hidden server 130 may include protected data that is synchronized to a data transmission state of a connection between client 110 and visible server 140. Such response may further include handshake signals to establish a connection between client 110 and hidden sever 130 in place of visible server 140. In either case, hidden server 130 may transmit the response using the address of visible server 140 so client 110 is unaware of the source of the protected data. Moreover, the response may be scrubbed of fingerprints that would reveal the use of hidden server 130 in place of visible server 140.

Figure 2:
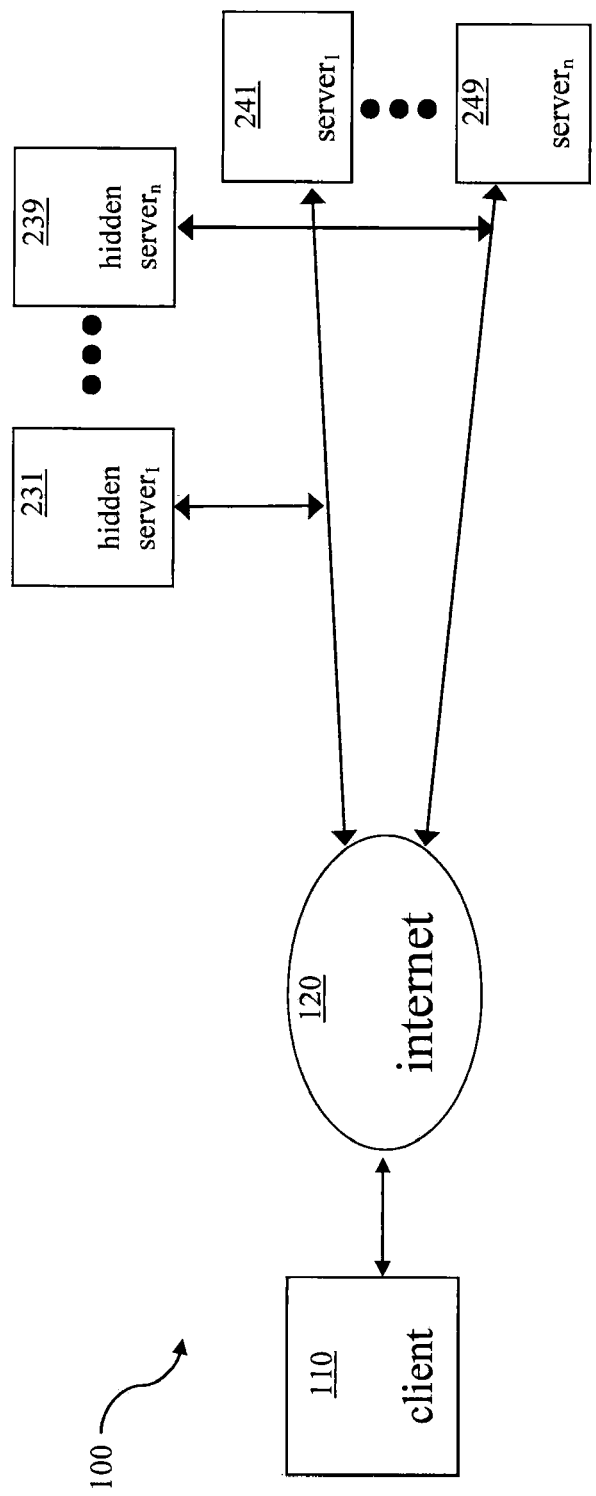
FIG. 2 is a block diagram of a second embodiment of a communication network with a plurality of hidden servers and visible servers.

In another embodiment illustrated in FIG. 2, network 100 may have one or more servers 241-249 with visible addresses. With the use of one or more visible servers 241-249, one or more hidden servers 231-239 may also be used to process service requests intended for one or more visible servers 241-249. A single hidden server 231 may be assigned to a single visible server 241, or a single hidden server 231 may be assigned to handle service requests of more than one visible server. Alternately, one or more visible servers 241-249 may provide multiple services. Each such service may be provided by a different one of hidden servers 231-239.

The operating systems of visible servers 241-249 may be of a first type. Examples of operating systems include Windows, Linux, Unix and OS-X. The operating systems of visible servers 241-249 may be different from each other and may change over time to protect the integrity of visible servers 241-249. Servers 241-249 might also run simultaneous instances of operating systems as virtual machines.

The operating systems of hidden servers 231-239 may be a second type different from the type of operating system running on visible servers 241-249. Examples of operating systems include Windows, Linux, Unix and OS-X. The difference in operating systems between visible servers 241-249 and hidden servers 231-239 should reduce the likelihood that attacks directed against the operating systems of visible servers 241-249 will be successful against the operating systems of hidden servers 231-239. Other hardware and software features may also be different from visible servers 241-249 to similarly reduce the overlap and security vulnerabilities between the visible servers and the hidden servers.

Hidden servers 231-239 may be configured to operate with unknown addresses or no addresses of their own. For example, if the network connecting hidden servers 231-239 is a TCP/IP network, hidden servers 231-239 may employ network interface cards having no IP addresses of their own, but operate at IP addresses of visible servers 241-249. Alternatively, hidden servers 231-239 may include combinations of receiving network interface cards and transmitting network interface cards. The receiving network interface cards may operate in a promiscuous mode that snoops on service requests directed to visible servers 241-249. The transmitting network interface cards may be configured to operate at the IP addresses of visible servers 241-249.

Figure 3:
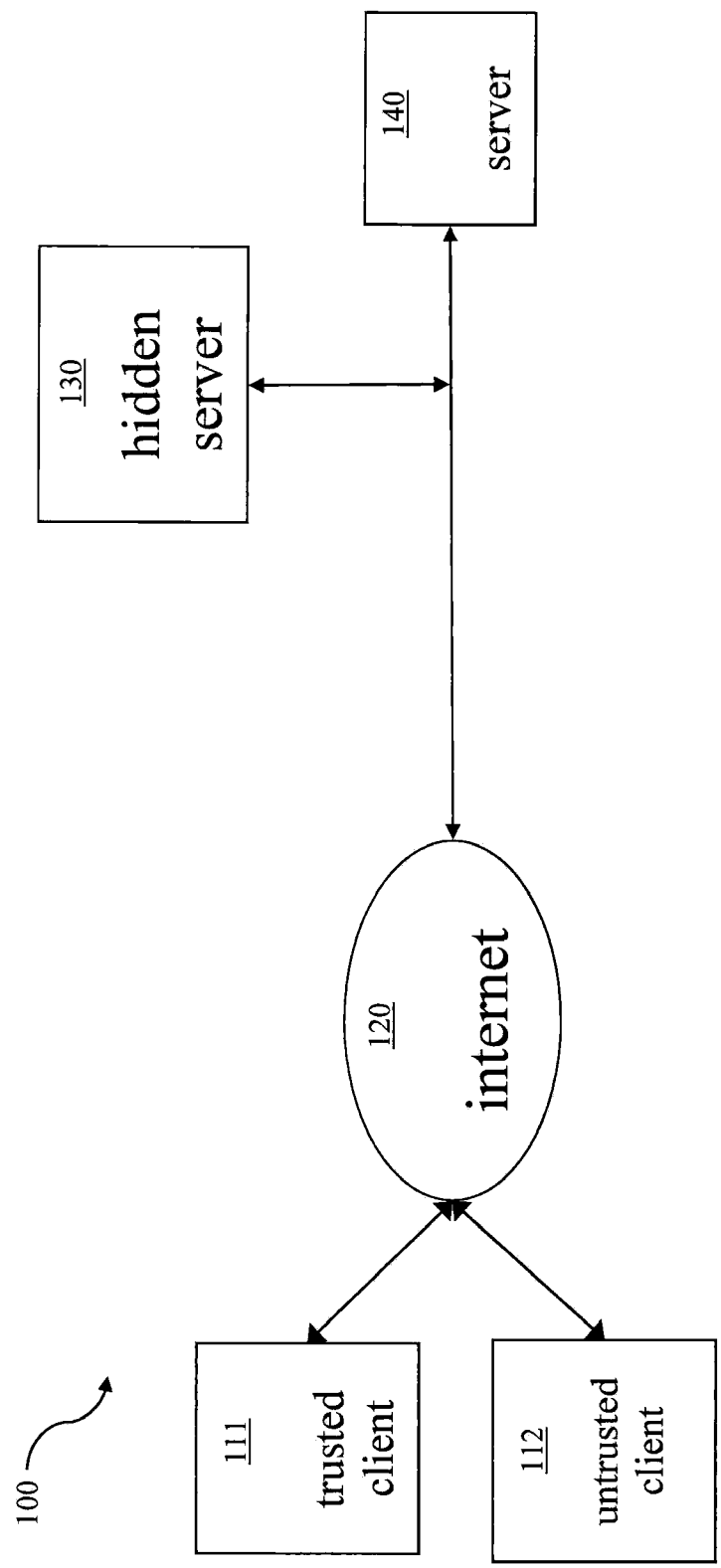
FIG. 3 shows a third embodiment of a communication network with a trust client and an untrusted client.

FIG. 3 shows a network 100 which has an authentication mechanism between clients 111 and 112 and server 140. Client 111 has been authenticated with server 140 and is considered to be a trusted client. Client 112 has not undergone authentication or has failed the authentication process. Thus, client 112 may be considered an untrusted client. In this embodiment, hidden server 130 may only handle service requests from trusted client 111 to limit access to hidden server 130 to only trusted client 111.

In an alternative embodiment, hidden server 130 may handle certain types of service requests while leaving visible server 140 to handle the remaining types of service requests. For example, hidden server 130 may respond only to service requests in a protected protocol, such as HTTP.

Figure 4:
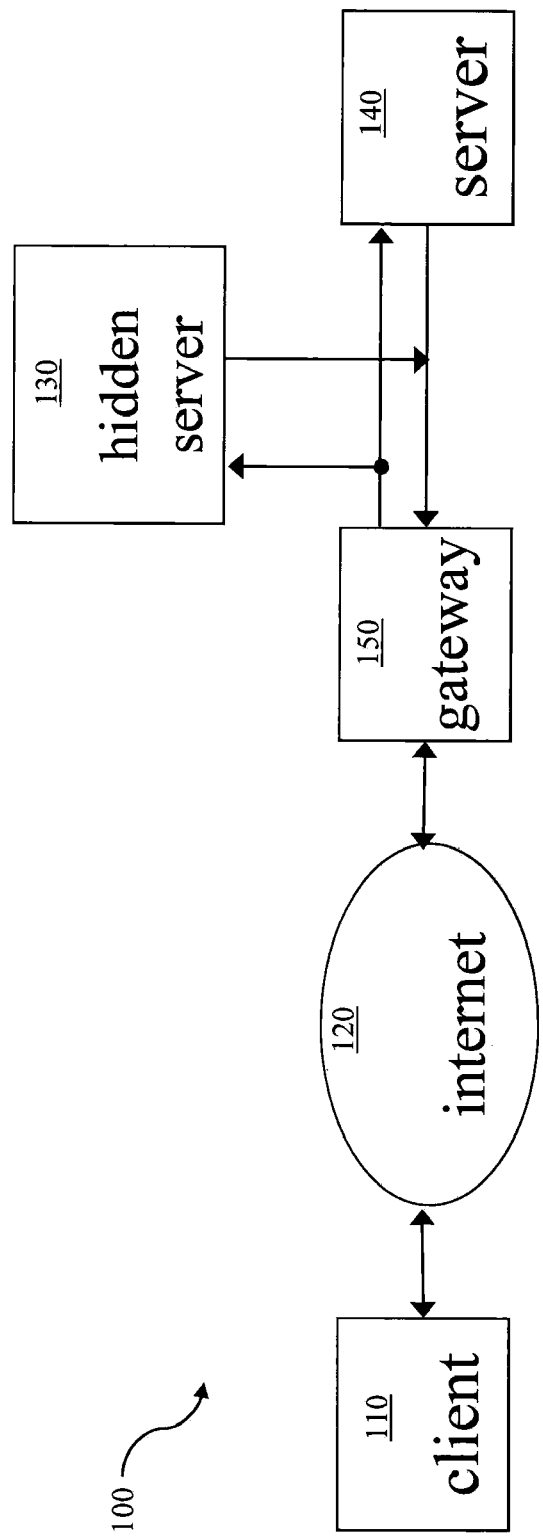
FIG. 4 is a block diagram of a fourth embodiment of a communication network including a gateway.
Figure 5:
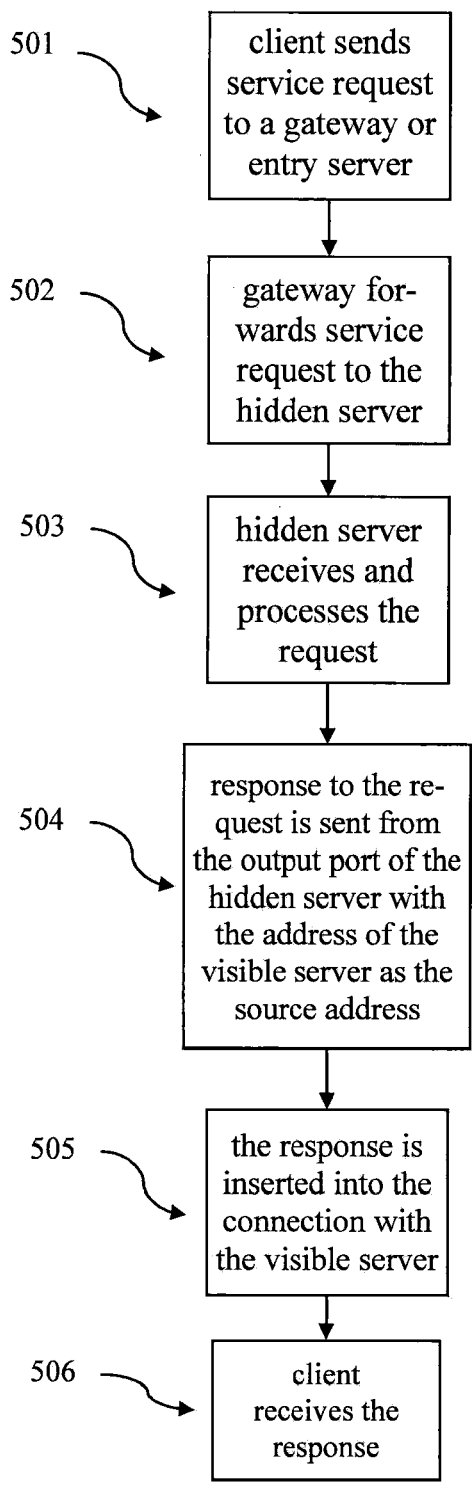
FIG. 5 is a flow diagram showing a method of communicating with a hidden server.

FIG. 4 shows a network 100 with a client 110 which communicates with servers 130 and 140 over the internet 120 through a gateway device 150 or other equivalent device. The mechanism with which the service requests is handled is explained with reference to FIG. 5. In 501, client 110 sends a service request addressed to visible server 140. The service request passes through the network 120 and reaches gateway 150. Gateway 150 forwards the service request to hidden server 130 in 502.

Figure 6:
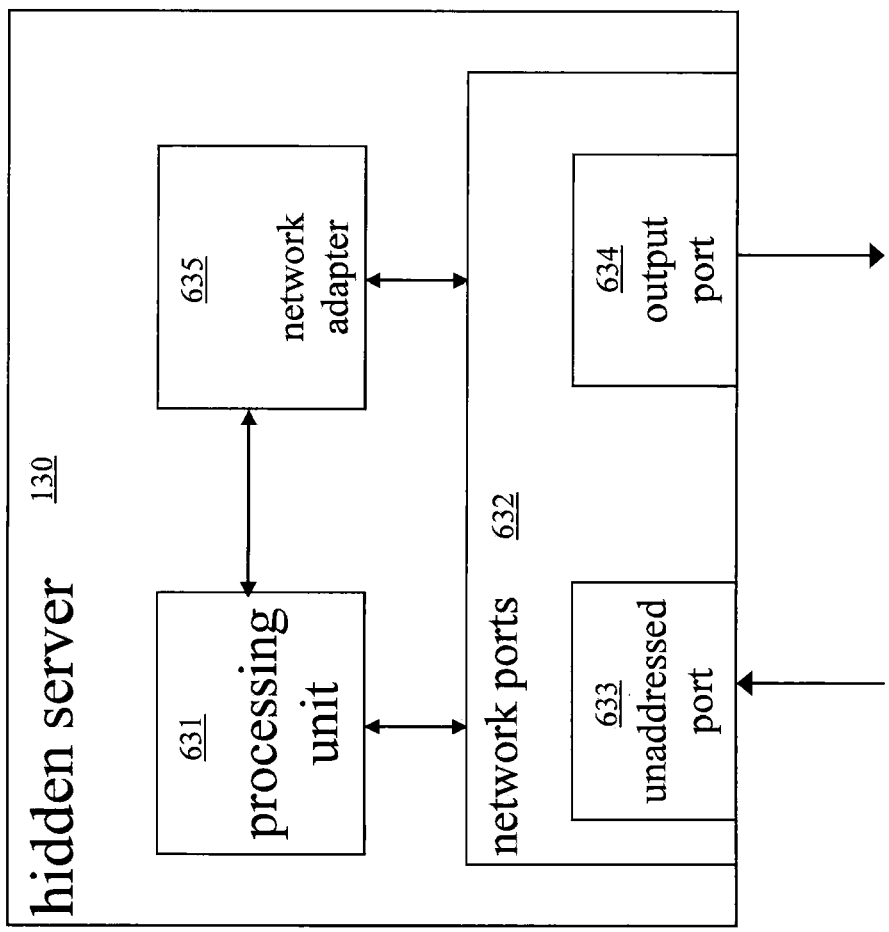
FIG. 6 is a block diagram of an embodiment of a hidden server.

One embodiment of hidden server 130 is shown in FIG. 6. Hidden server 130 may include a processing unit 631 and network port 632. Network port 632 may include unaddressed port 633 and output port 634. Alternatively, the unaddressed port 633 and output port 634 may be combined into a single port. Hidden server 130 may further include a network adapter 635.

Returning to FIG. 5, hidden server 130 receives and processes the service request at 503. The service request may be received at unaddressed port 633 and passed to processing unit 631. The processing unit 631 processes the service request and forms a response addressed to client 110 with the address of visible server 140 as the source address of the response. The response may be inserted into the connection between visible server 140 and client 110 in a connection-oriented protocol. The response passes through gateway 150 over internet 120 to client 110.

Figure 7:
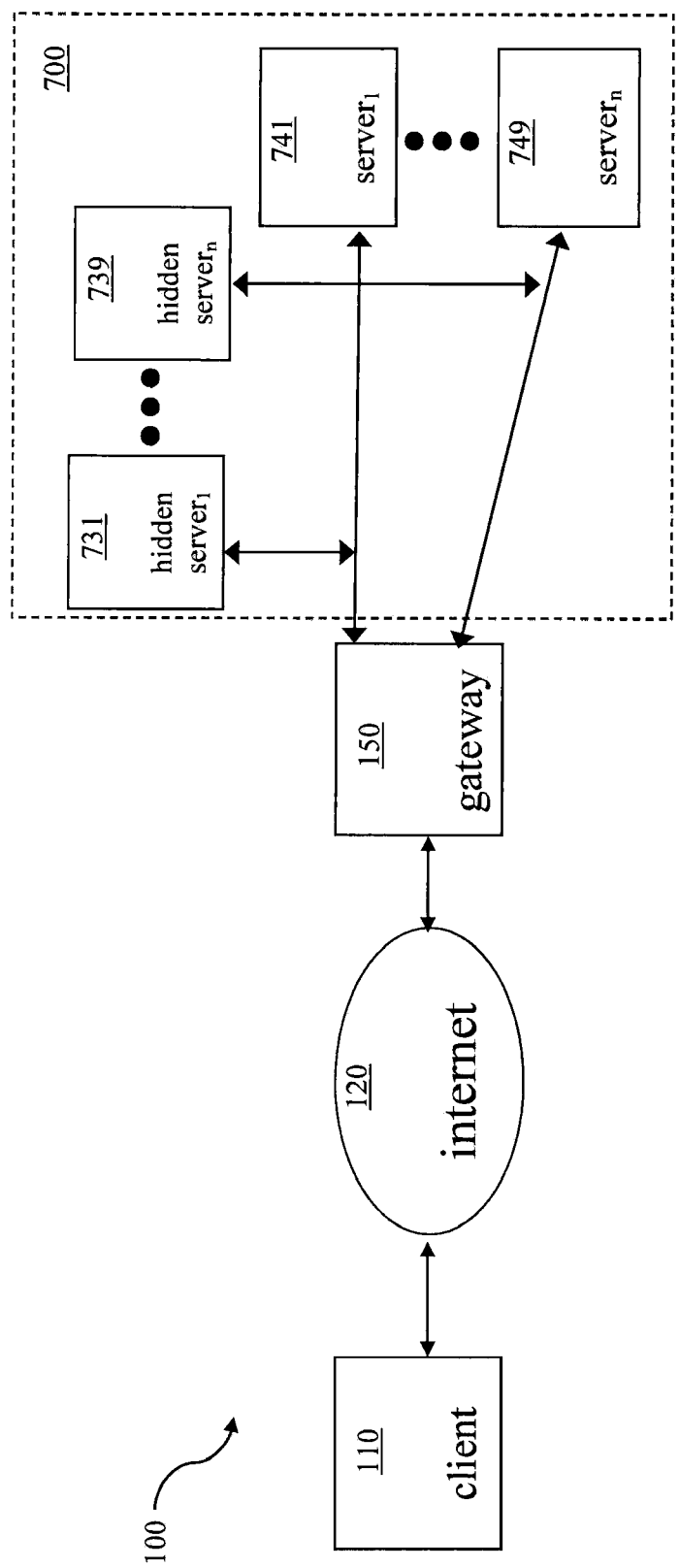
FIG. 7 is a block diagram of a fifth embodiment of a communication network having a gateway, a plurality of hidden servers, and a plurality of visible servers.
Figure 8:
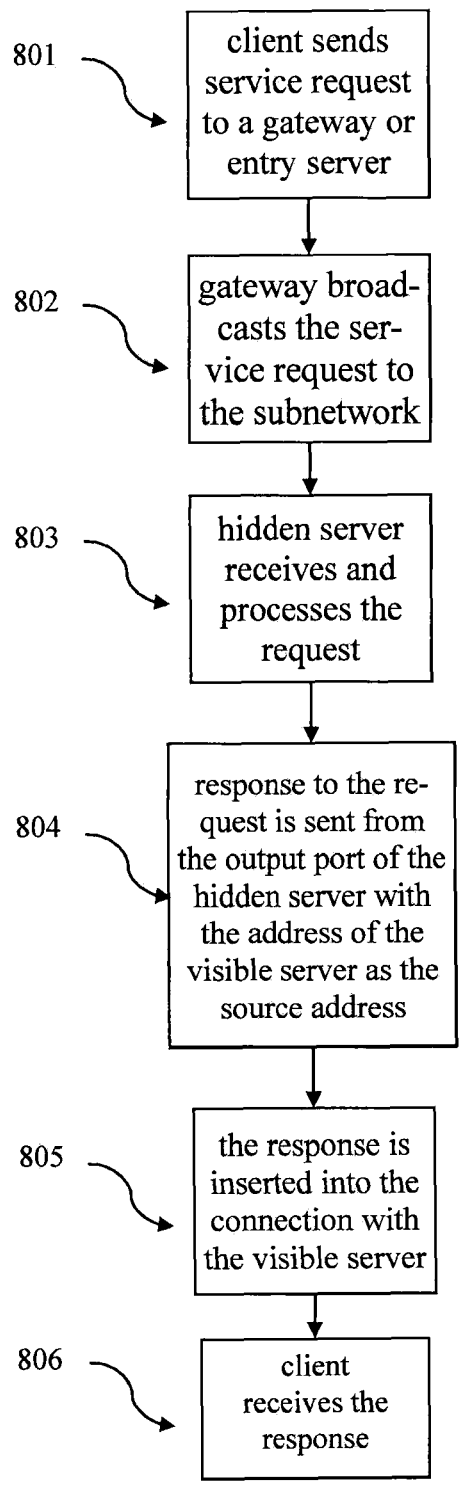
FIG. 8 is a flow diagram showing a second method of communicating with a hidden server in a subnetwork.

In another embodiment shown in FIG. 7 and FIG. 8, client 110 sends a service request to gateway 150 at 801, and gateway 150 broadcasts the service request to a subnetwork 700 at 802. Subnetwork 700 may include a plurality of hidden servers 731-739 and a plurality of visible servers 741-749. Alternatively, gateway 150 may be implemented as an entry server, router, bridge, switch, or network adapter 635 in hidden server 130. The service request may be addressed to visible server 741. After the service request is broadcast to subnetwork 700, hidden server 731, which may be handling service requests for visible server 741, receives and processes the request at 803. Hidden server 731 sends the response from its output port to client 110 at 804, where the response may have the address of the visible server as the source address. If a connection-oriented protocol is being used in the communication, the response may be inserted into the connection between the client 110 and the visible server 741 at 805. At 806, the client receives the response which may be sent from hidden server 731.

In another embodiment, the method and system described herein may be implemented as a set of instructions in a software program on a non-transitory computer readable medium for execution by a processor in a computer. The computer readable medium allows the computer to receive and process service requests addressed to a visible server.

The computer readable medium may be any medium capable of storing or encoding instructions and causing a processor to perform the methods or functionality described therein. The computer readable medium may be any type of memory including magnetic, solid-state, or optical storage.

Additionally, one or more of the methods, functionality, and systems described herein may also be implemented using virtual systems by distributing elements of the methods or systems or functionality across multiple devices or consolidate methods or functionality or systems into devices.

Although this invention has been disclosed in the context of certain exemplary embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above.

In this specification, "a" and "an" and similar phrases are to be interpreted as "at least one" and "one or more." References to "an" embodiment in this disclosure are not necessarily to the same embodiment.

Many of the elements described in the disclosed embodiments may be implemented as modules. A module is defined here as an isolatable element that performs a defined function and has a defined interface to other elements. The modules described in this disclosure may be implemented in hardware, a combination of hardware and software, firmware, wetware (i.e hardware with a biological element) or a combination thereof, all of which are behaviorally equivalent. For example, modules may be implemented using computer hardware in combination with software routine(s) written in a computer language (such as C, C++, Fortran, Java, Basic, Matlab or the like) or a modeling/simulation program such as Simulink, Stateflow, GNU Octave, or LabVIEW MathScript. Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies may be used in combination to achieve the result of a functional module.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. Thus, the present embodiments should not be limited by any of the above described exemplary embodiments. In particular, it should be noted that, for example purposes, the above explanation has focused on the example of transmitting the request over the internet. However, one skilled in the art will recognize that embodiments of the invention could, for example, be implemented in various other types of networks including intranets and virtual private networks.

In addition, it should be understood that any figures that highlight any functionality and/or advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:

1. A method of preventing network attacks, comprising:
   intercepting by an unaddressed port of a hidden device or a port of the hidden device having an address hidden from other devices a service request from a second device addressed to an addressed port of a visible device, wherein the hidden device has no address or an address hidden from other devices including the visible device;
   processing of the service request by the hidden device;
   providing a response based on the processing from the hidden device with a source address other than the address of the hidden device; and
   sending the response to the second device.

2. The method of claim 1, wherein the service request includes a destination address and the destination address is an address of the visible device.

3. The method of claim 1, wherein the source address is an address of the visible device.

4. The method of claim 1, further comprising inserting the response into a communication stream of the visible device.

5. The method of claim 1, wherein a connection-oriented protocol is used.

6. The method of claim 1, further comprising receiving the service request at a receiving server, the receiving server broadcasting the service request to a subnetwork.

7. The method of claim 1, further comprising accepting the service request from a trusted second device and denying the service request from an untrusted second device.

8. The method of claim 1, wherein the hidden device is implemented differently from the visible device and the response configured to prevent discovery of the implementation of the hidden device.

9. An hidden device, comprising:
   an unaddressed port or a port of the hidden device having an address hidden from other devices configured to intercept a service request from a second device addressed to an addressed port of a visible device; and a processing unit configured to:
  process the service request, and
  provide a response which appears to be from the visible device from the hidden device with a source address other than the address of the hidden device; and
an output port configured to send the response to the second device;
wherein the hidden device has no address or an address hidden from other devices including the visible device.

10. The hidden device of claim 9, wherein a destination address of the service request is an address of the visible device.

11. The hidden device of claim 9, wherein the source address of the response is an address of the visible device.

12. The hidden device of claim 9, wherein the service request from a trusted second device is accepted and the service request from an untrusted second device is denied.

13. The hidden device of claim 9, further comprising:
at least one network adapter configured to intercept the service request addressed to the at least one visible device and broadcast the service request locally.

14. The hidden device of claim 9, wherein the hidden device is implemented differently from the visible device and the response being configured to prevent discovery of the implementation of the hidden device.

15. A system of preventing network attacks, comprising:
at least one hidden device comprising:
  an unaddressed port or a port of the hidden device having an address hidden from other devices configured to intercept a service request addressed to an addressed port of at least one visible device from a second device, and
  an output port configured to transmit a response to the second device from the hidden device with a source address other than the address of the hidden device, wherein the hidden device has no address or an address hidden from other devices including the visible device; and
the at least one visible device comprising at least one addressed port.

16. The system of claim 15, further comprising at least one network adapter configured to receive the service request addressed to the at least one visible device and broadcast the service request locally.

17. The system of claim 15, wherein the at least one hidden device is implemented differently from the at least one visible device and the response being configured to prevent discovery of the implementation of the at least one hidden device.

18. The system of claim 17, wherein the response includes a sequence number and an acknowledgement number, and the source address is the address of the at least one visible device.

19. The system of claim 15, wherein the system is configured using at least one virtual system.

20. The method of claim 1, further comprising blocking a response to the service request from the visible device.

21. The device of claim 9, further comprising at least one intermediate device configured to block a response to the service request from the visible device.

22. The system of claim 15, further comprising at least one intermediate device configured to block a response to the service request from the visible device.

* * * * *